April 21, 1959
C. K. LITMAN
2,883,253
APPARATUS FOR HANDLING AND STORING PREPARED FOODS
Filed Oct. 14, 1957
2 Sheets-Sheet 1
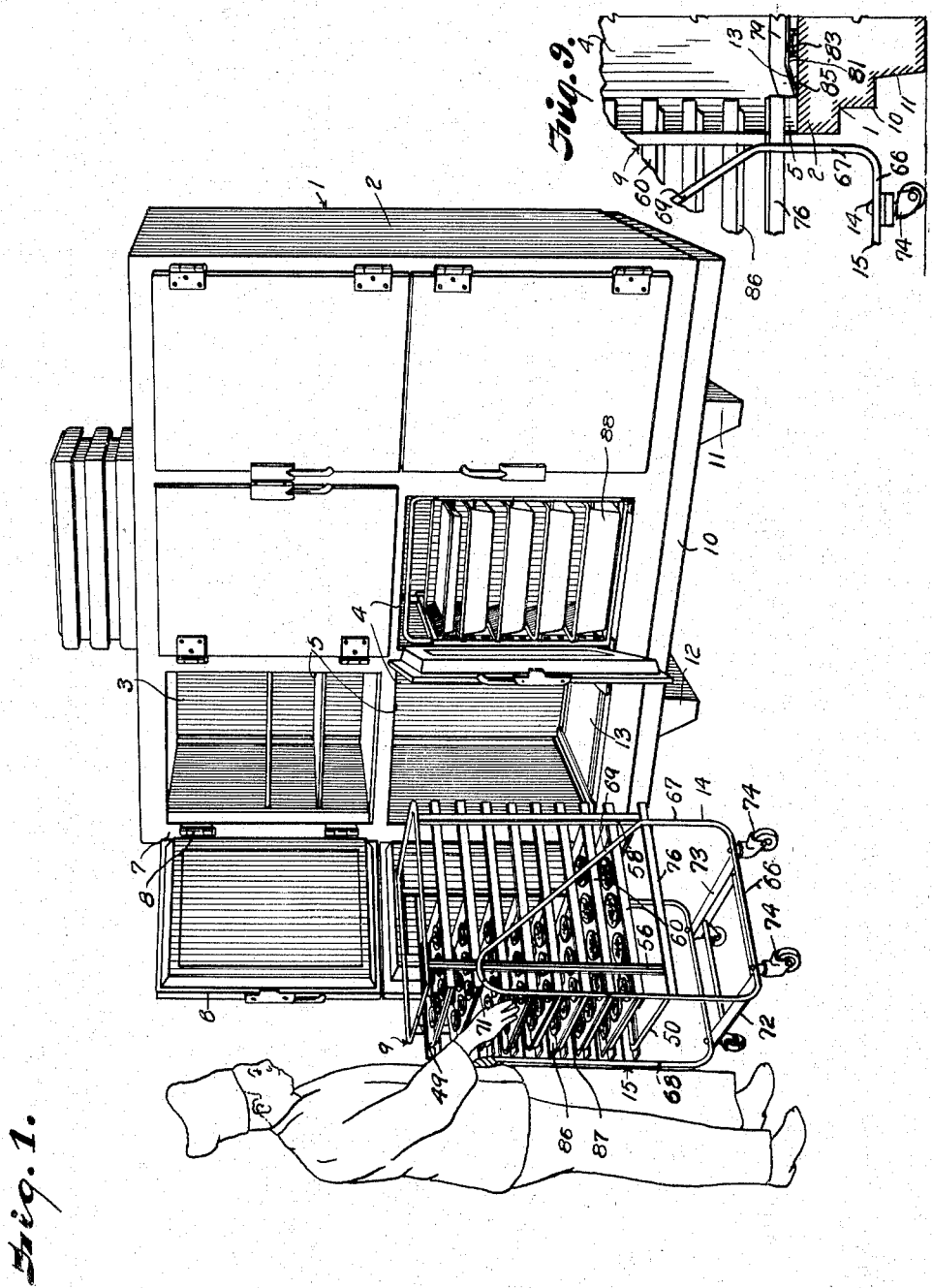
INVENTOR.
*Chester K Litman.*
BY
*Paul E Mullendore*
ATTORNEY

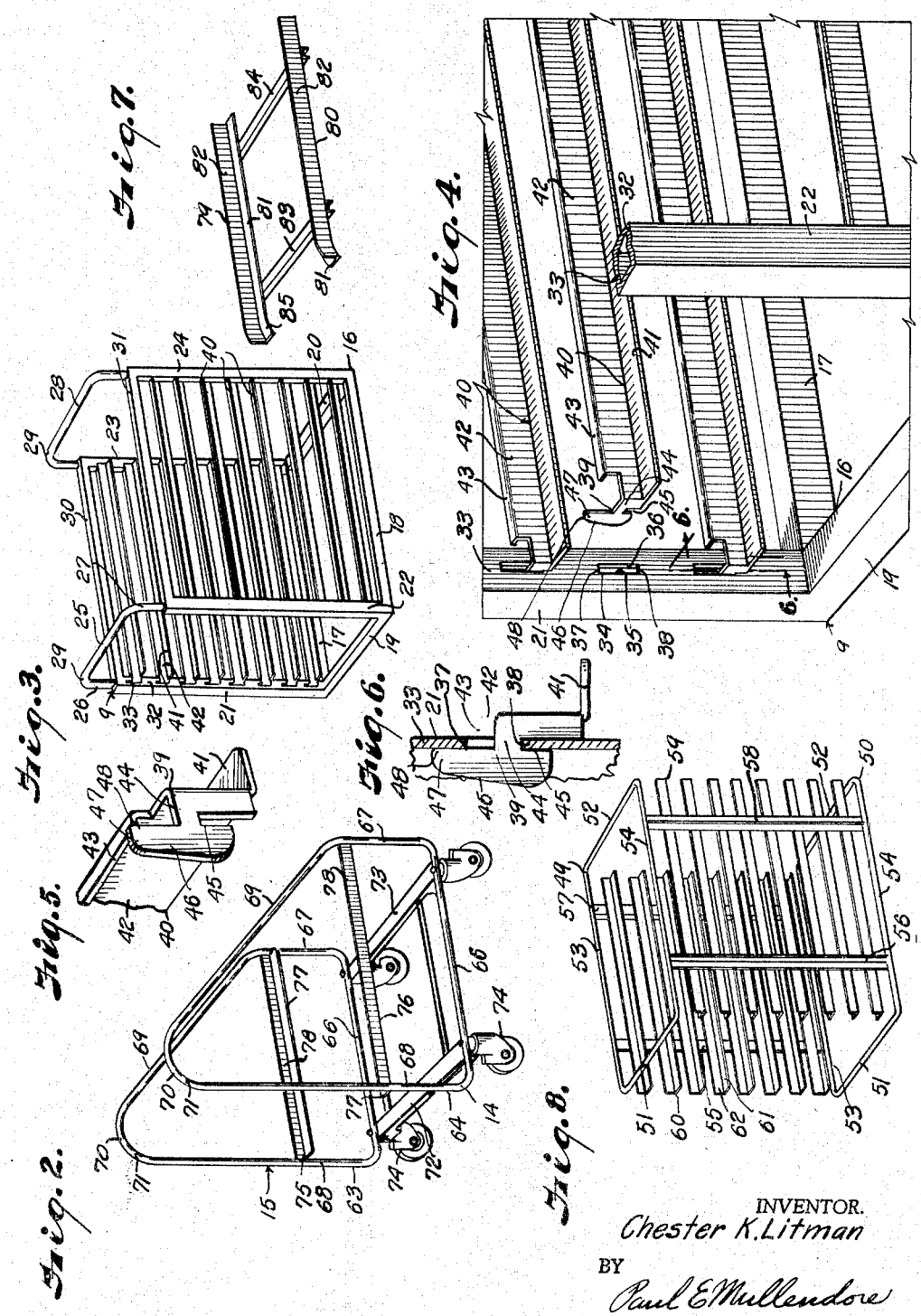

United States Patent Office 2,883,253
Patented Apr. 21, 1959

2,883,253

APPARATUS FOR HANDLING AND STORING PREPARED FOODS

Chester K. Litman, Kansas City, Mo., assignor to Koch Refrigerators, Inc., Kansas City, Kans., a corporation of Missouri Application October 14, 1957, Serial No. 689,991

4 Claims. (Cl. 312—237)

This invention relates to an apparatus for handling and refrigerating prepared foods, such as salads, appetizers, desserts, and the like.

For example, prior to the present invention restaurateurs and caterers purchased perishable food ingredients in the bulk and they were kept under refrigeration until just before they were needed for preparing the individual dishes from them, usually just before the serving period began, in order that the prepared dishes could be served in as wholesome and attractive condition as possible. But where large quantities of such servings were needed, preparation of the food dishes must be started so far in advance of mealtime that many of the prepared dishes lost their freshness before serving. This was because of inadequate space and lack of refrigerating facilities for storing individual servings of prepared foods in large quantities. The only solution was to employ a sufficient amount of help to complete the work in a shorter space of time. The result was that the employee's labor was concentrated to the time just before serving, and consequently the preparation of perishable food dishes resulted in labor problems, excessive expense, lack of space in which the work was performed and lack of storage capacity for the short period before serving, all in an unsatisfactory attempt to furnish the guests with freshly prepared dishes.

The principal object of the present invention is to avoid these difficulties by providing compact handling and storage apparatus, whereby the preparation of perishable food dishes and individual servings can be done long prior to serving time and the servings conveniently and safely held under refrigeration.

Other objects of the invention are to provide an apparatus which includes a refrigerator having refrigerating compartments adapted for containing racks, each having a series of superimposed supports arranged to carry a plurality of trays on which individual servings are placed; to provide for movement of the loaded racks into and removal from the refrigerating compartments as single units; and to provide a mobile truck or dolly for the racks, whereby the racks may be carried at a level to facilitate movement onto track elements contained within the refrigerator compartments.

Further objects of the invention are to provide racks, adapted for interchange in the respective compartments and equipped to carry serving trays filled with the individual servings or pans in which the perishable foods are prepared and stored ready for division into individual servings; and to provide a rack with adjustable supports to conform with the heights of the trays and/or pans adapted to be carried thereby.

In accomplishing these and other objects of the invention, I have provided an improved apparatus, the preferred form of which is illustrated in the accompanying drawings, wherein:

Fig. 1 is a perspective view of a refrigerator equipped with refrigerating compartments and showing racks constructed in accordance with the invention for carrying pans and/or trays in which prepared foodstuffs are placed for storage prior to serving time. The figure also illustrates a mobile truck or dolly supporting one of the racks and showing it being moved into position for insertion of the rack into one of the refrigerating compartments.

Fig. 2 is a perspective view of the truck or dolly for moving the racks.

Fig. 3 is a perspective view of one form of rack, which is equipped with adjustable tray and pan supports or slides.

Fig. 4 is an enlarged fragmentary view of the rack shown in Fig. 3 to better illustrate the adjustable supports or slides, and showing one of the supports or slides being moved into position for insertion in the rack.

Fig. 5 is a perspective view of one end of one of the tray or pan supports.

Fig. 6 is a fragmentary section on the line 6—6 of Fig. 4.

Fig. 7 is a perspective view of the track for insertion of a rack into the refrigerator compartments.

Fig. 8 is a perspective view of a modified form of rack, equipped with fixed supports or slides.

Fig. 9 is a fragmentary section through the lower front of the refrigerator casing and lower portion of the truck showing the rack in position to be moved onto the track element within one of the refrigerator compartments.

Referring more in detail to the drawings:

1 designates a refrigerator including a casing 2 having a plurality of upper and lower storage compartments 3 and 4 provided with front openings 5 adapted to be closed by doors 6. The doors 6 in the illustrated instance are secured to side stiles 7 of the casing by hinges 8, whereby the doors may be swung outwardly to completely clear the front openings 5, thereby leaving the passageways to the compartments completely open to facilitate insertion of unitary racks 9 into the lower of the respective compartments. The casing 2 preferably has an inset base portion 10 supported from the floor on legs 11 and 12, whereby the floor level 13 of the respective lower compartments is at a convenient height above the floor to provide for height of the carriage portion 14 of a mobile truck or dolly 15 which is arranged to carry the racks 9 from a food preparing or loading station to the refrigerator 1, and to carry the loaded racks 9 from the refrigerator to the serving station, as later to be described.

One form of rack is illustrated in Figs. 3 to 6, inclusive. This form includes a rectangular bottom frame 16 having longitudinal side rails 17—18 connected by end rails 19—20. Fixed to the bottom frame at the juncture of the side and end rails are corner posts or uprights 21—22 and 23—24. The uprights 21 and 22 are interconnected at their upper ends by a cross bar 25 having ends rounding into depending legs 26 and 27 that are attached, respectively, to the upper ends of the uprights 21 and 22. The other uprights 23 and 24 are likewise connected at their upper ends by a similar cross bar 28. The cross bars 25 and 28 constitute handles 29 by which the rack may be lifted when desired. The uprights 21—22 are connected with the uprights 23—24 at their upper ends by longitudinal rails 30 and 31 extending parallel with the rails 17 and 18 at the bottom of the rack. The uprights are preferably formed of rectangular tubular stock 32, as best shown in Fig. 4, in order to provide facing flanges or webs 33, each having a vertical series of slots 34. In the illustrated instance, the slots each have spaced parallel side edges 35 and 36 and upper and lower end edges 37 and 38 (Fig. 4) to pass therebetween brackets 39 on the respective ends of supports in slides 40. The slides 40 are of a length so that the ends thereof overlap the facing flanges 33 of the uprights 21—22 and 23—24 at the respective ends of the rack. Each slide 40 is of angular cross section to provide horizontal flanges 41 adapted to extend inwardly of the rack and vertical flanges 42 adapted to provide longitudinal guides for the support of trays or pans that are adapted to be inserted in the rack, as later to be described. To strengthen the supports 40, the vertical flanges 42 thereof have their upper portions bent outwardly, as shown at 43, to provide outwardly extending ribs. The brackets 39 are preferably provided by bending the shaped extensions on the ends of the vertical flanges 42 laterally, as best shown in Figs. 4 and 5. Each bracket 39 is shaped to provide a lateral neck portion 44 having a downwardly opening notch 45 in its lower edge adapted for engaging over the bottom edge 38 of the slots 34. The neck portions 44 terminate in heads 46 which extend upwardly a sufficient distance to make contact with the inner marginal portion of the upper edges 37 of the slots 34 when the notches 45 are engaged with the edges 38, as best shown in Fig. 6. In inserting the heads 46 of the brackets 39 in the slots 34, they are tipped so that the upper portion 47 of the heads 36 passes through the slots 34, whereafter they may be shifted upwardly a sufficient distance for the notches 45 to enter the slots 34, and when the notches 45 are in registry with the edges 38, the brackets are shifted to cause the notches 45 to engage the edges 38 and the terminals 48 of the heads will engage the inner marginal face of the upper edges 37 of the slots 34 (Fig. 6).

In Fig. 8 is shown another form of rack having upper and lower rectangular frames 49 and 50. The frames 49 and 50 are preferably formed of rod material bent and welded to provide end rails 51 and 52 and side rails 53 and 54. The upper and lower rectangular frame portions are interconnected by spaced apart uprights 55, 56, 57 and 58, preferably formed of angle material to provide ample vertical strength in carrying the tray supports 59, which in this instance comprise angles 60 having inturned flanges 61 and vertical flanges 62. The vertical flanges 62 are welded to flanges of the vertical supports 55—56 and 57—58, so that the tray supports 59 are properly spaced along the height of the uprights to accommodate trays therebetween and provide ample room for the containers in which the food portions are placed, as later described.

To facilitate movement of the racks and to carry the loaded racks from the food preparing station to the refrigerator 1, the invention further employs trucks or dollies 15, previously referred to. One of the trucks 15 is best shown in Fig. 2 and includes side frame members 63 and 64. In the illustrated instance, the side frame members are formed of rod or tubular material, bent and welded to provide horizontal rails 66, front and rear uprights 67 and 68 and a connecting rail 69. The rear uprights 68 are preferably of longer length than the front uprights 67, so that the rails 69 incline upwardly and rearwardly from the front uprights 67 and connect with the rear uprights in rounding portions 70 to constitute handles 71 at the upper rear of the truck. The side frame members 63 and 64 are interconnected by cross bars 72 and 73 that are welded to the under side of the horizontal rails 66. The ends of the cross bars 72 and 73 carry casters 74 to provide for mobility of the truck.

The racks previously described are adapted for support on the trucks at a convenient elevation to be moved into the refrigerator compartments, and, therefore, each frame member of the truck is provided at a suitable distance above the floor with horizontal guides 75 and 76, also formed of angles, to provide inwardly extending flanges 77 for seating under the longitudinal rails of the racks and vertical flanges 78 by which the racks are centered between the side members of the truck or dolly. The guides 75 and 76 thus described are suitably attached to the uprights as by welding.

To provide for support of the racks on the floor 13 of the refrigerating compartments 4, the lower compartments have tracks 79 and 80 (Figs. 1, 7 and 9) also formed of angle material, to provide horizontal flanges 81 to register with the flanges 77 and vertical flanges 82 adapted to register with the vertical flanges 78 when the truck is moved into a position in front of one of the openings 5. The tracks 79 and 80 are connected by cross members 83 and 84 that are welded to the under side of the horizontal flanges and which, when the tracks are inserted in the refrigerator, support the tracks in alignment with the guides on the truck. To guard against any misalignment in levels, the forward ends of the tracks are preferably curved downwardly toward the floor of the refrigerator compartment, as indicated at 85.

In using the apparatus, for example, salads and like dishes may be made up long prior to serving time. The bulk materials necessary for preparation of the servings are removed from refrigerated storage and the salads or the like are then completely prepared and placed in individual dishes ready for serving. One of the racks is placed on the truck 15. This can be easily accomplished by lifting the rack by the handles 28 and 29 in Fig. 3 or by the bars 50 and 52 in the form shown in Fig. 8. The rack is set between the side members 63 and 64 of the truck, with the lower longitudinal members 17 and 18 in the rack shown in Fig. 3 or 53 and 54 in the rack of Fig. 8 resting upon the inturned flanges 77 of the horizontal guides 75 and 76. The truck 15 is then wheeled to the place where the salads are prepared. As the individual dishes are filled, they are placed in trays 86 and the trays are slid into the racks with the rims 87 thereof moving along the inturned flanges 61. The trays may be of a size to fill the entire length of the rack, or smaller trays may be inserted, with two or more trays being inserted on each of the supports. If desired, the racks may be filled prior to loading thereof on the truck. After the rack has been filled, the truck carrying the rack is wheeled to the position of the refrigerator. After opening the door to one of the compartments of the refrigerator, the front of the truck is aligned with the refrigerator compartment, as shown in Fig. 9, whereupon the rack is pushed into the refrigerator compartment, with the bottom rails 17—18 or 53—54 sliding along the inturned flanges 77 of the truck and onto the inturned flanges 81 of the tracks 79 and 80 (Fig. 9). The truck is then moved out of position to permit closing of the refrigerator door, after which another rack is placed therein and returned to the place of preparing the foods.

It may be that the prepared foods are to be left in pans 88, from which the food is subsequently removed for serving. The rack with the adjustable supports 40 is best suited for this purpose, since the pans may vary in depth. The supports 40 are, therefore, adjusted to the size of the pans to be used by inserting the heads 46 of the brackets in the proper slots 34 and moving them into position where the notches 45 pass over the lower edge portions 38 of the slots, with the terminals 48 of the head portions of the brackets engaging against the inner face of the flange or web 33 of the uprights. The pans, after filling, may then be slid into position in the rack in the same manner as the trays previously described. When the rack is loaded, it is carried by means of the truck to be inserted in another compartment of the refrigerator, where the contents of the pans are kept under storage until serving.

When serving time starts in large restaurants, the refrigerator door is opened to the compartment containing the rack to be removed and the empty truck is moved into position in front of the compartment so that the rack may be pulled out of the compartment and onto the inturned flanges 77 of the guide 75 and 76. The truck is then wheeled away to the place where the individual servings are removed from the rack.

In smaller restaurants it may be more desirable to remove one tray or pan at a time, in which case a desired tray or pan may be readily removed by hand after opening the door to the refrigerator compartment, leaving the rest of the trays or pans under refrigeration. Likewise, if it is desired, a single pan or tray may be carried to the refrigerator and inserted into any empty space in a rack by sliding it with the rim thereof on the inturned flanges of the rack supports.

From the foregoing, it is obvious that I have provided a simple apparatus for handling and storing prepared foods ready for serving or prepared foods in individual servings in a compact and orderly manner, so that the foods may be prepared and divided into individual servings whenever it is convenient for the chefs. Since the foods, such as salads or the like, have been kept under refrigeration from the time they were prepared until they are removed for serving, the guests are assured of receiving crisp, fresh salads and similar foods. Also, the restaurant or catering company may accomplish the work in an orderly manner at substantially less cost and with less wastage.

What I claim and desire to secure by Letters Patent is:

1. An apparatus for handling and storing foods in a refrigerator of the type having a compartment and a door opening into said compartment and spaced above the level of the floor on which the refrigerator is supported, said apparatus including spaced apart track members having support within said compartment near the sides thereof and extending from said door opening rearwardly into the compartment, a rack having an open front and provided with a base for sliding support upon said track members and having pairs of spaced apart guide members extending from said open front to the rear of the compartment and arranged with said pairs one above the other to slidably support a plurality of trays in superimposed relation, said trays being removable individually through said open front of the rack and the rack being adapted to be bodily movable into and withdrawn from the track members through said open front of the refrigerator compartment to remove all of said trays as a unit, and a mobile truck having spaced apart guides adapted to register with the track members when the truck is positioned in front of the door opening to slidably move the rack therefrom into the compartment and to withdraw the rack from the compartment onto the truck for inserting and removing the trays as a unit while maintaining the trays substantially level.

2. An apparatus for handling and storing foods in a compartment of an insulated cabinet, wherein the floor of the compartment is at a higher level than the room floor on which the cabinet is supported, and wherein the cabinet has a door opening into the compartment, said apparatus including a rack having a width to slide through the door opening into said compartment, said rack having uprights carrying superimposed horizontal tray supports open at the ends, trays slidable into and out of the rack on said tray supports, and a mobile truck adapted to roll upon the room floor and having side members spaced apart and open at the ends to accommodate the rack therebetween and having horizontal supports engageable with portions of the rack to support the rack at a level to slide into the compartment without tilting of the trays.

3. An apparatus for handling and storing foods in a compartment of an insulated cabinet, wherein the floor of the compartment is at a higher level than the room floor on which the cabinet is supported, and wherein the cabinet has a door opening into the compartment, said apparatus including spaced apart guide rails extending from near sides of the door opening into the compartment, a rack having a width to slide through the door opening and having portions slidable along the guide rails to support the rack in said compartment, said rack having uprights carrying superimposed horizontal tray supports open at the ends, trays slidable into and out of the rack on said tray supports, and a mobile truck adapted to roll upon the room floor and having side members spaced apart and open at the ends to accommodate the rack therebetween and having horizontal supports engageable with said portions of the rack to support the rack with said portions at the level of said guide rails to register with said guide rails in the compartment for cooperating therewith in providing substantially continuous tracks for transfer of the rack loaded with said trays into the compartment and for removing a rack from the compartment onto the truck without tilting of the trays.

4. An apparatus for handling and storing foods in a compartment of an insulated cabinet, wherein the floor of the compartment is at a higher level than the room floor on which the cabinet is supported, and wherein the cabinet has a door opening into the compartment, said apparatus including spaced apart guide rails extending from near sides of the door opening into the compartment, a rack having a base portion of a width to slide through the door opening for support on the guide rails and having uprights carried by the base portion and having facing sides each provided with a vertical series of slots, horizontal tray supports having lateral brackets engaging in certain slots to adjust the said tray supports vertically of the uprights for providing different spacing between the said tray supports, trays slidable into and out of the rack on said tray supports, and a mobile truck adapted to roll upon the room floor and having side members spaced apart to accommodate the rack therebetween and having horizontal supports at the level of said guide rails to register with said guide rails in the compartment and cooperating therewith in providing substantially continuous tracks for transfer of the rack loaded with said trays into the compartment and for removing a rack from the compartment onto the truck for inserting and removing all of the trays as a unit.

References Cited in the file of this patent
UNITED STATES PATENTS

| | | |
|---|---|---|
| 1,504,854 | Baker | Aug. 12, 1924 |
| 2,330,339 | De More | Sept. 28, 1943 |
| 2,506,448 | Gregor | May 2, 1950 |
| 2,825,617 | Morgain | Mar. 4, 1958 |